United States Patent
Howell

(10) Patent No.: US 9,845,060 B2
(45) Date of Patent: Dec. 19, 2017

(54) TRUCK BED INSERT

(71) Applicant: Steven R. Howell, Scranton, PA (US)

(72) Inventor: Steven R. Howell, Scranton, PA (US)

( * ) Notice: Subject to any disclaimer, the term of this patent is extended or adjusted under 35 U.S.C. 154(b) by 0 days.

(21) Appl. No.: 15/164,408

(22) Filed: May 25, 2016

(65) Prior Publication Data
US 2016/0347261 A1 Dec. 1, 2016

Related U.S. Application Data

(60) Provisional application No. 62/168,373, filed on May 29, 2015.

(51) Int. Cl.
*B60R 13/01* (2006.01)
*B62D 25/20* (2006.01)

(52) U.S. Cl.
CPC .......... *B60R 13/01* (2013.01); *B62D 25/2072* (2013.01)

(58) Field of Classification Search
CPC ............................ B60R 13/01; B62D 25/2072
USPC ................................................ 296/37.6, 39.2
See application file for complete search history.

(56) References Cited

U.S. PATENT DOCUMENTS

| | | | | |
|---|---|---|---|---|
| 5,288,124 A * | 2/1994 | Ward | ........................ | B60P 3/42 296/24.43 |
| 6,120,078 A * | 9/2000 | Smyl | ....................... | B60R 13/01 296/39.1 |
| 6,131,983 A * | 10/2000 | Jackson | .................. | B60R 13/01 296/39.1 |
| 7,416,236 B2 * | 8/2008 | Boddie | ................... | B60R 11/00 296/39.2 |
| 7,438,338 B1 * | 10/2008 | Schumacher | ............. | B60R 5/04 222/404 |
| 2003/0085584 A1 * | 5/2003 | Golden | ................... | B60R 13/01 296/39.2 |
| 2012/0181810 A1 * | 7/2012 | Alvarino | ................. | B60R 13/01 296/39.2 |

* cited by examiner

*Primary Examiner* — Jason S Daniels
(74) *Attorney, Agent, or Firm* — Snyder, Clark, Lesch & Chung, LLP

(57) ABSTRACT

A removable, easily disassembled, truck bed can be installed in place of rear seats in a Jeep Wrangler® or four-door Jeep Wrangler Unlimited® type vehicle. In one embodiment, this truck bed is constructed of sheet steel bolted together in various parts to allow for easy shipping and storage. In another embodiment, this truck bed is constructed of molded plastic or fiberglass to allow for water-resistance and light weight. This truck bed converts a Jeep Wrangler®-type vehicle to a small pick-up truck, which would be of use for hauling small loads of bulk or 'loose fill' material (sand, dirt, gravel, mulch). The truck bed is easily removable so that when load-hauling is not required it can be removed and the vehicle's rear seats reinstalled for carrying passengers.

20 Claims, 7 Drawing Sheets

TRUCK BED INSERT

CROSS-REFERENCE TO RELATED APPLICATIONS

This utility application claims the benefit under 35 U.S.C. §119(e) of provisional application Ser. No. 62/168,373 filed on May 29, 2015, entitled "Truck Bed Insert." The entire disclosure of the provisional application is included herein by reference.

FIELD OF THE INVENTION

The present invention relates generally to truck cargo area liners, and more particularly, to creating a truck bed in a vehicle where it does not yet exist. This is distinct from truck bed "liners" which merely line the walls of an existing truck bed to protect it from scratches, water and the like.

BACKGROUND

Off-road vehicles with removable tops, such as various Jeep® Wrangler® or Land Rover® models, are rugged multi-purpose vehicles capable of hauling passengers or (with the rear seats removed) fairly large amounts of packaged cargo, such as luggage or camping supplies. However, these vehicles are not easily adaptable to carry construction materials or other "loose fill" cargo, such as sand, dirt, gravel, mulch, etc., since the cargo area is not fully contained (allowing material to spill into the driver's area) and the bottom of the cargo area is usually carpet or other material that should not be exposed to the elements. In addition, many Jeep® Wrangler® owners enjoy driving their vehicle without the top in summer weather, but face the issue of quickly covering the vehicle in the face of rain or other inclement weather. While quick-install tops for the front of the cabin exist and serve their purpose, the tonneau covers that exist to cover the rear of the vehicle limit the ability to carry cargo and are insecure due to being made of fabric. A rigid installed cargo area would keep rain out of the cabin and still allow the top to be removed, requiring only the quick installation of a top for the front two seats to be weather resistant. The present invention serves both of these purposes.

DESCRIPTION

DETAILED DESCRIPTION

The present invention is a removable, easily disassembled, truck bed which can be installed in place of the rear seats in a Jeep Wrangler® or four-door Jeep Wrangler® Unlimited type vehicle. In one embodiment, this truck bed is constructed of sheet steel bolted together in various parts to allow for easy shipping and storage. In another embodiment, this truck bed is constructed of molded plastic or fiberglass to allow for water-resistance and light weight. In all cases, the insert does not require the permanent removal of the standard roll bars as do currently-available truck conversion kits such as those sold for Jeep® Wranglers® by MOPAR®. As such, the present invention allows for the vehicle to easily convert between carrying cargo and carrying passengers.

An exemplary truck bed insert includes a bottom sheet or bottom tray plus L-shaped sides that attach to it and to the outer rails of the vehicle body. These sides may be of minimum height to span the space or may be of additional height so as to increase the load carrying volume of the truck bed. The higher version of the sides may have hinged storage bins built within the unused space between the vehicle body or wheel well and the sides of the truck bed. Since the truck bed keeps the weather out of the rear of the vehicle, another embodiment of the truck bed includes a sliding wall of steel, fabric, or plastic (with or without a window) that can be pulled up from the front of the truck bed and fastened to the top roll bars of the vehicle to keep weather out of the cab of the vehicle as well, leaving only the front top of the vehicle to be covered by an additional half-top. Similarly, another embodiment also includes a sliding tonneau cover that is incorporated into the front and sides for additional security and protection.

This truck bed serves to convert a Jeep Wrangler® type vehicle to a small pick-up truck, which would be of use for hauling small loads of bulk material (sand, dirt, gravel, mulch) for home-owners, landscapers, cottage owners, or anyone who needs to get a small load of bulk material to the rugged locations made possible by the Jeep's® off-roading capability. It is easily removable so that when load-hauling is not required it can be removed and the Jeep's® rear seats reinstalled for carrying passengers.

Figure 1:
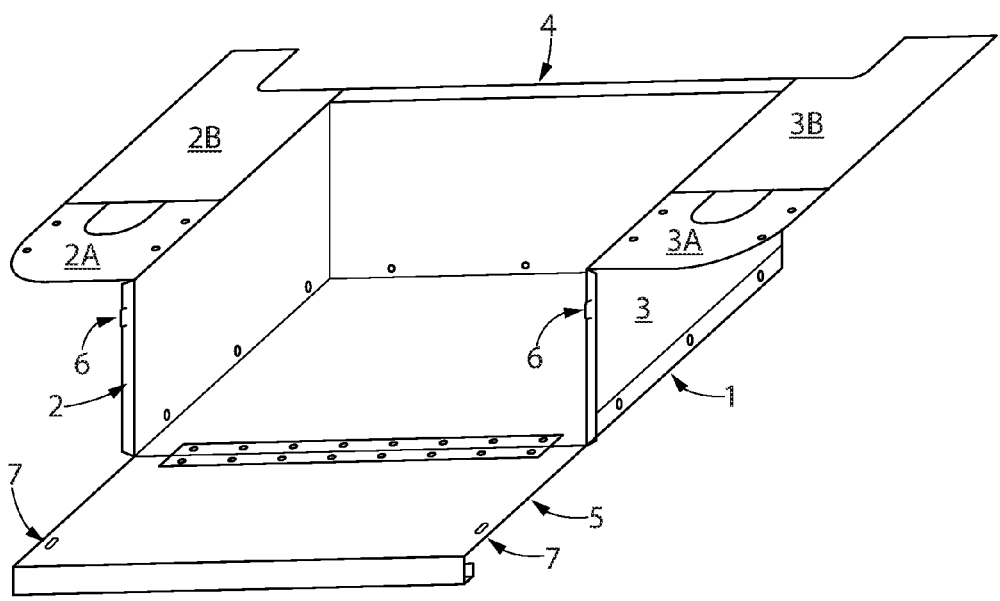
FIG. 1 is an isometric drawing of an exemplary assembled truck bed insert.
Figure 7:
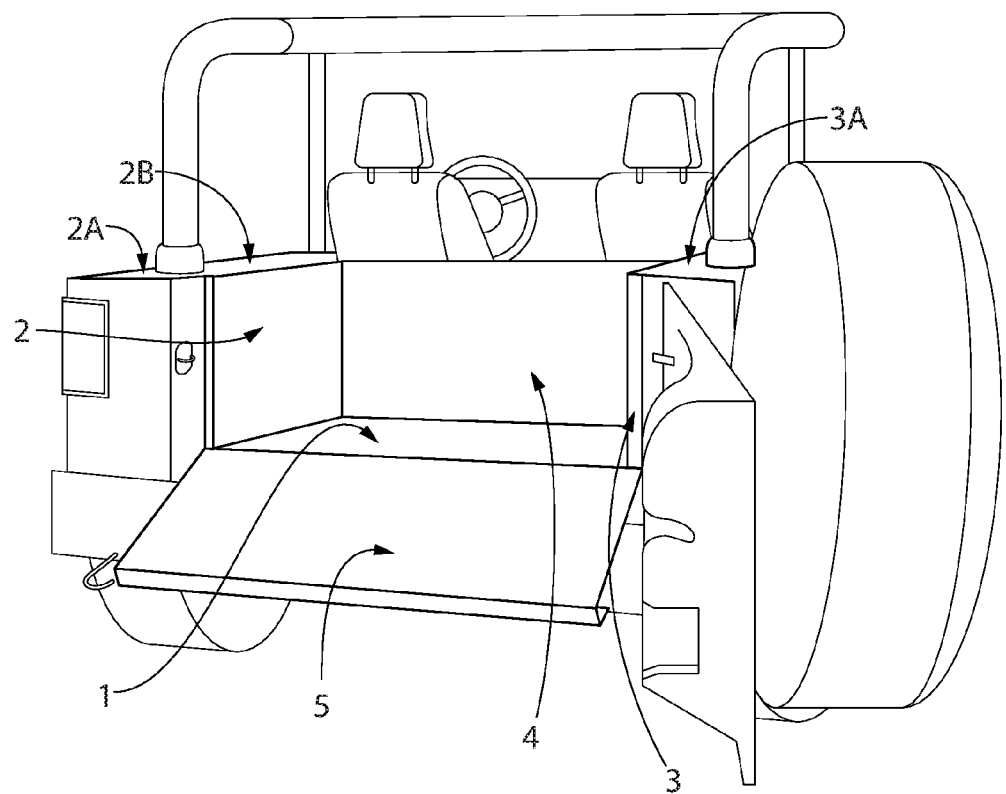
FIG. 7 is a perspective drawing of an exemplary assembled truck bed insert in situ.

FIGS. 1 and 7 show a fully assembled exemplary insert, with optional hinged tailgate 7 and left and right two-piece bolt-together side units comprising side walls 2, 3 and top portions 2A, 2B and 3A, 3B respectively. Portions 2A and 2B having cut outs to fit easily around roll bars. In an exemplary embodiment most parts fasten with bolts and nuts, but the front tops 2B, 2B of the side units may fasten to the sides with magnets or hook-and-loop fasteners. Likewise the side units 2, 3 are fastened to the side rails of the vehicle using manufacturer's bolt holes, or with magnetic fasteners.

Figure 2:
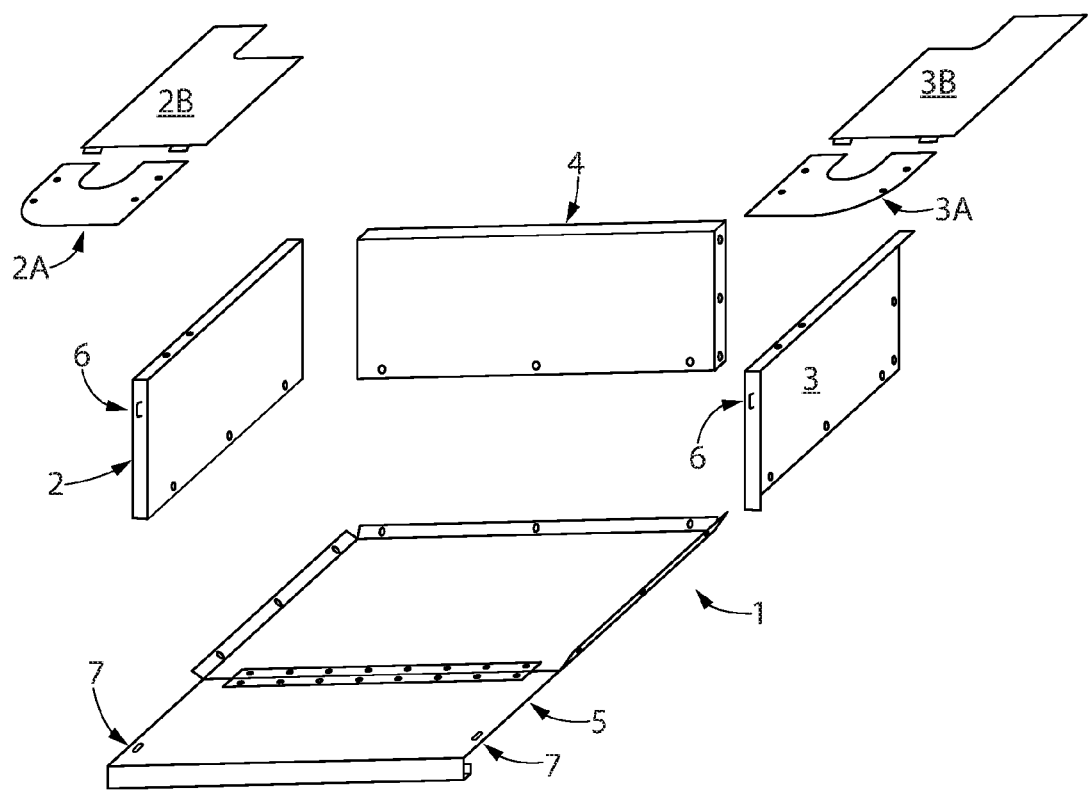
FIG. 2 is an exploded view of the insert of FIG. 1.

FIG. 2 shows an exploded view of the parts of the truck bed insert. Part 1 is the bottom tray, with bent up tabs on front, left and right. Part 2 is the left side of the bed, with approximately 1 inch bent tabs at rear and top. Part 2A and 2B are separate top surfaces that bolt or otherwise fasten to the top flange of the left side wall 2, fitting around the vertical roll bar of the vehicle. Part 3 is the right side of the bed, with approximately 1 inch bent tabs at rear and top. Parts 3A and 3B are separate top surfaces that bolt or otherwise fasten to the top flange of the right side, fitting around the vertical roll bar of the vehicle. Note that each of the sides (e.g. parts 2, 2A, and 2B) can be manufactured as a single L-shaped piece for strength, either solid or with a hinge connecting parts 2A and 2B to side wall 2, but the depicted three-part embodiment is preferable as it collapses flat for storage or shipping (the depicted tabs on 2B fit under 2A to help connect them). The same is true for the right side (parts 3, 3A, and 3B). Part 4 is the front bulkhead/cabin divider, with bent-back tabs at left and right with holes for bolting to left and right side walls, and a folded over C-shaped top bend 20 (shown in FIG. 3) to avoid sharp edges facing the vehicle's cabin. Part 5 is the rear tailgate, a simple flat piece of metal with a folded over top (as depicted) for strength and ease of gripping. Metal loops 6 in the rear parts of the side units 2, 3 fit through slots 7 in the tailgate when it is closed and allow a pin or hook (not shown) to be inserted through the loop on the other side of the tailgate to hold it closed.

Figure 3:
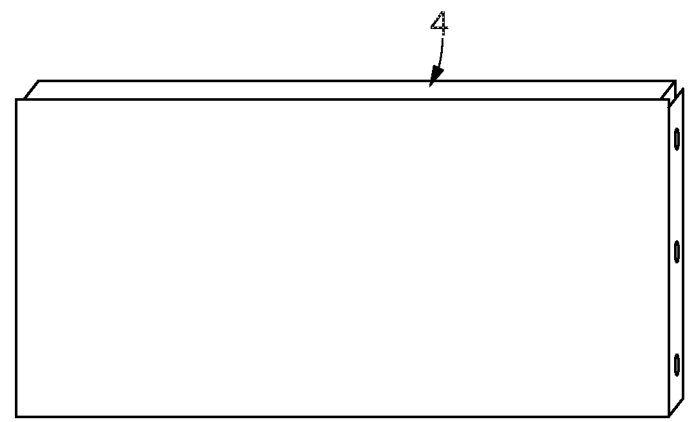
FIG. 3 is a front, back and side view of an exemplary bulkhead/cabin divider of the insert of FIG. 1
Figure 3:
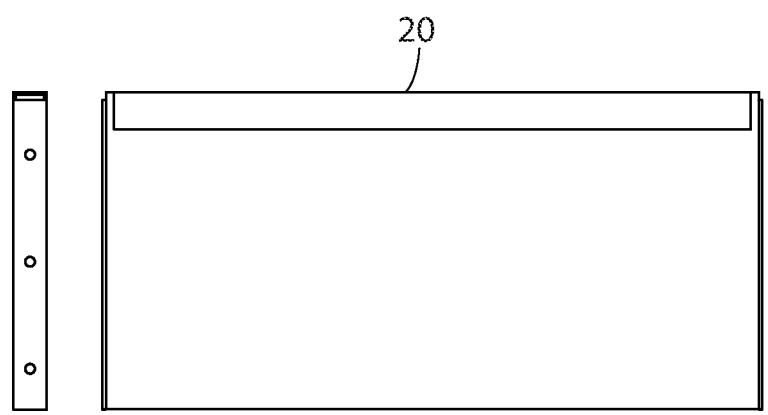

FIG. 3 shows an exemplary front bulkhead/cabin divider 4 that keeps the load in the bed and out of the vehicle's cabin. When it is constructed of strong enough metal (e.g. heavy gauge steel or 1/16" or 1/8" aluminum) it is strong enough and stiff enough to require no further reinforcement. If it is constructed of lighter gauge steel, it may need to be bent into a beam shape, perhaps around an internal stiffening beam of lighter material. The top is from the rear, showing how the tabs at top, left and right are bent towards the front or cabin. The side view shows bolt holes to connect to the right side panel. The last view shows the bulkhead from the front or cabin side, showing how the top tab 20 is double-bent into a U-shape to keep sharp edges from pointing at the occupants of the vehicle.

Figure 4:
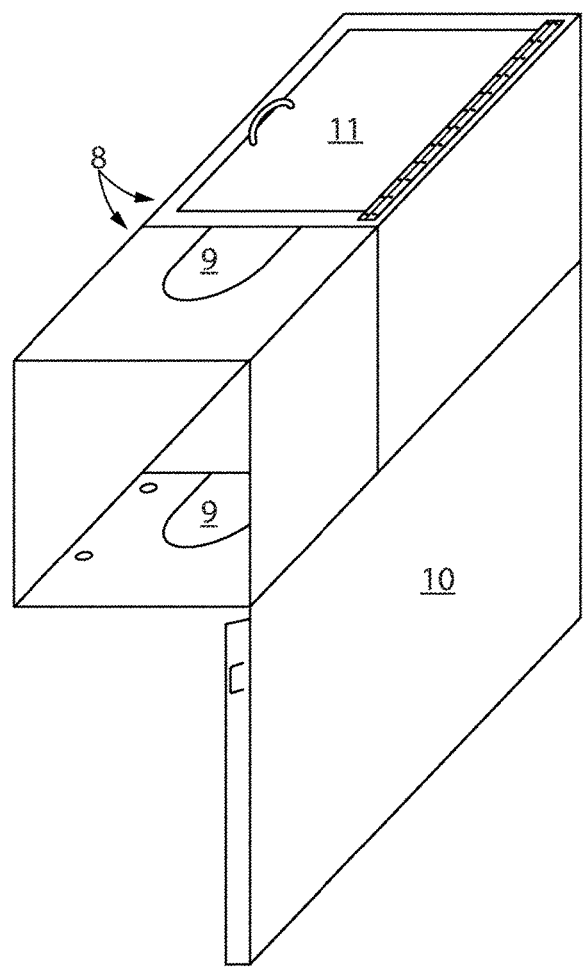
FIG. 4 is a drawing of an exemplary side storage unit.

FIG. 4 shows an optional left unit embodiment 8 to replace horizontal elements 2A and 2B from FIG. 2. This embodiment increases the height of the sides of the truck bed above the side rails of the vehicle and allows the bed to carry more cargo. These may be of one or two piece construction and must have cutouts 9 to fit around the vehicle roll bars. The optional unit 8 eithers bolts to the existing side unit 2 or may have an integral side wall extending below it 10 to replace the original side unit entirely. Storage areas 11 with hinged lids can be incorporated into these higher sides to make use of the empty space over the Jeep's wheel wells. Higher front bulkhead units 4 and a higher rear tailgate 5 (or add-on extensions to the originals) may be necessary to increase the height of the truck bed on all sides and contain higher loads.

Figure 5:
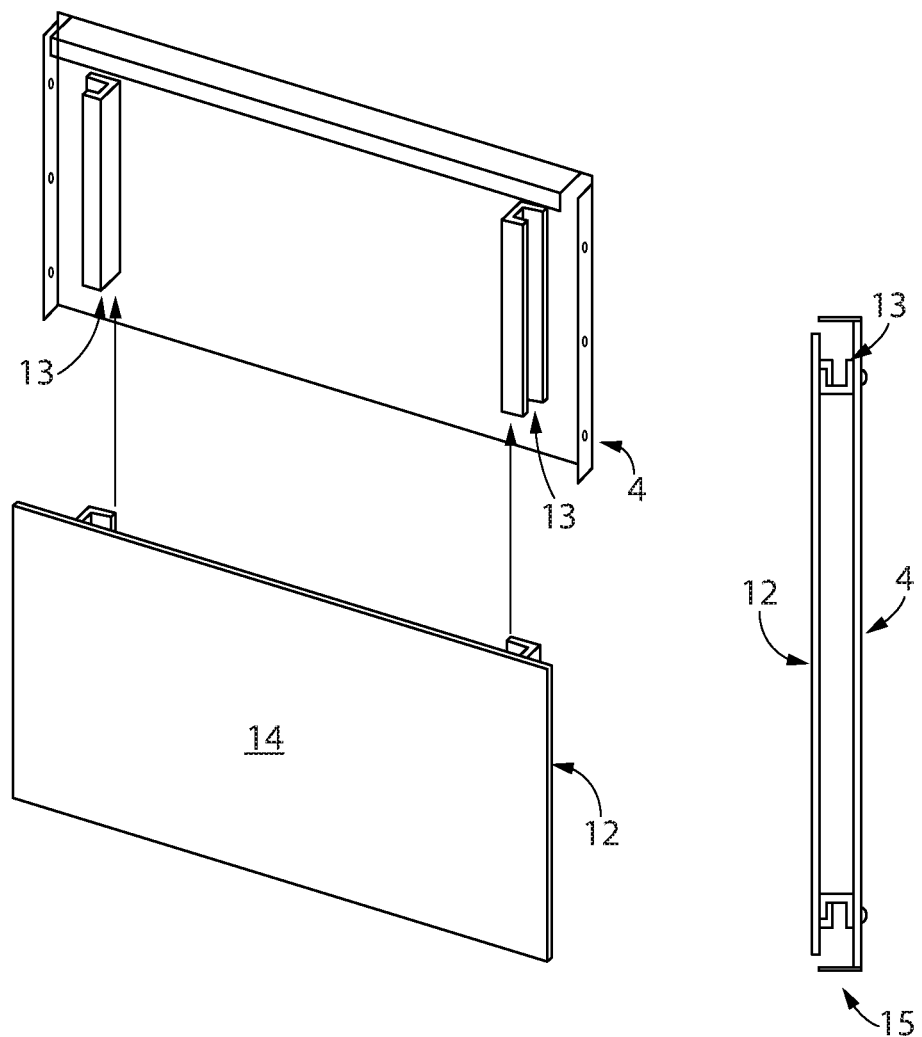
FIG. 5 is an isometric drawing of an exemplary two-part front cabin divider and a side view of same.

FIG. 5 shows an optional front sliding cabin divider 12 that slides into u-shaped sockets 13 on the cabin side of the front bulkhead 4 and extends vertically to help protect the cabin from the load, wind, or weather. The optional front sliding cabin divider can have a window 14 in it or not, as required by government regulations. The optional front sliding cabin divider may fasten (when up) to the top of the roll bars and upper speaker enclosure of the vehicle. On the right is a top view of an assembly 15 formed of two parts 12 and 4 mated, with their c-shaped brackets 13 engaged. Other sliding mechanisms could also be used, as could a soft fabric divider on a window-blind style roll-up mechanism.

Figure 6:
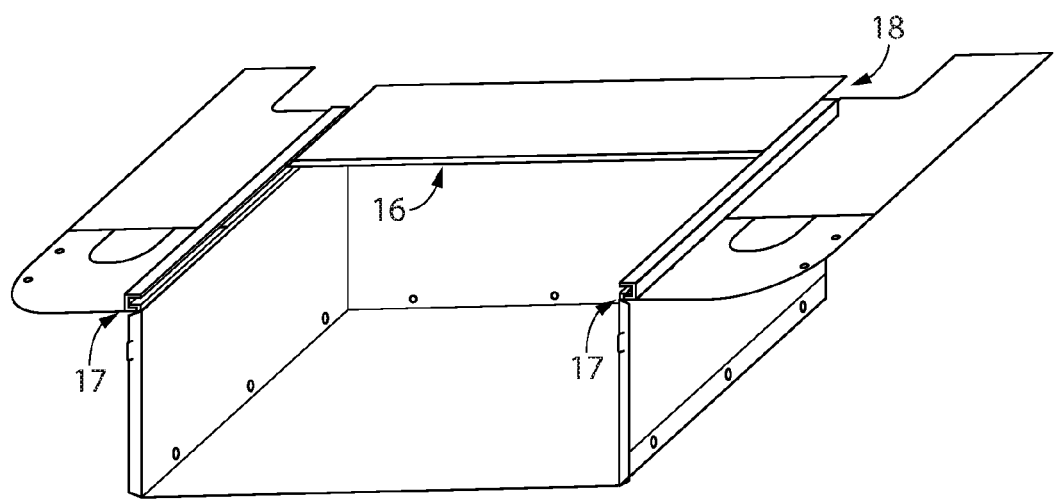
FIG. 6 is an isometric drawing of an exemplary insert incorporating a tonneau cover.

FIG. 6 shows an optional sliding tonneau cover 16 to securely cover the load-carrying open part of the truck bed insert. The cover itself can be formed from either a soft fabric material or a connected set of ridged tambour elements as in a roll-top wooden desk. In either case, the edges of the top slide along c-shaped channels 17 fastened to the top surfaces of the side units 2, 3 until they reach and fasten to the top surface of the rear tailgate. When not in use, the top can roll around a roller (18) fastened to the front bulkhead 4 in one of several positions, depending on whether the sliding front cabin divider is in use as in FIG. 5.

FIG. 7 depicts the rear of a Jeep Wrangler vehicle with an exemplary truck bed insert according to the invention installed.

The invention claimed is:

1. A removable truck bed insert for a truck having a cabin, a substantially rectangular truck bed, left and right side fenders having substantially flat top surfaces and roll bars extending vertically from the top surfaces of the respective left and right side fenders and adjacent to respective left and right sides of the truck bed, said removable truck bed insert comprising:
    a bottom floor,
    left and right side assemblies coupled to said bottom floor along first and second edges,
    a substantially vertical front assembly coupled to said bottom floor along a third edge and configured to separate the cabin from the truck bed,
        wherein said left and right side assemblies comprise substantially vertical side walls connected to first and second side assembly horizontal portions configured to rest on top of the respective left and right side fender top surfaces, and wherein at least one of said first or second side assembly horizontal portions comprises an opening to accommodate passage of the roll bar, and
    a piano-hinged connection between said bottom floor and said left side assembly, a piano-hinged connection between said bottom floor and said right side assembly and a piano-hinged connection between said bottom floor and said front assembly.

2. The removable truck bed insert of claim 1, wherein at least one of said first and second side assembly horizontal portions is connected to said vertical side wall by a hinge.

3. The removable truck bed insert of claim 1, wherein said side assemblies further comprise storage compartments mounted above at least one of said first or second side assembly horizontal portions.

4. The removable truck bed insert of claim 1 configured to accept front assemblies of different heights to accommodate larger or smaller loads.

5. The removable truck bed insert of claim 1, wherein said left and right side assembly vertical side walls are connected to said respective first and second side assembly horizontal portions with one of: hinges, bolts, magnets or hook and loop fasteners.

6. The removable truck bed insert of claim 1, wherein said left and right side assembly vertical side walls are connected to said respective first and second side assembly horizontal portions with one of: bolts, magnets or hook and loop fasteners.

7. The removable truck bed insert of claim 1, wherein said left and right side assembly vertical side walls are connected to said respective first and second side assembly horizontal portions with one of: bolts, magnets or hook and loop fasteners.

8. The removable truck bed insert of claim 1, wherein said front assembly comprises a two-part wall having a fixed portion connected to said bottom floor and a sliding portion adapted to be raised and lowered with respect to said fixed portion.

9. The removable truck bed insert of claim 8, further comprising a sliding tonneau cover incorporated in and configured to unroll from said front assembly.

10. The removable truck bed insert of claim 1, further comprising a sliding tonneau cover incorporated in and configured to unroll from said front assembly.

11. A removable truck bed insert for a truck having a cabin, a substantially rectangular truck bed, left and right side fenders having substantially flat top surfaces and roll bars extending vertically from the top surfaces of the respective left and right side fenders and adjacent to respective left and right sides of the truck bed, said removable truck bed insert comprising:

a bottom floor, and left and right side assemblies coupled to said bottom floor along first and second edges and a substantially vertical front assembly coupled to said bottom floor along a third edge and configured to separate the cabin from the truck bed, wherein said left and right side assemblies comprise substantially vertical side walls connected to first and second side assembly horizontal portions configured to rest on top of the respective left and right side fender top surfaces and wherein at least one of said first or second side assembly horizontal portions comprises an opening to accommodate passage of the roll bar, and wherein said front assembly comprises a two-part wall having a fixed portion connected to said bottom floor and a sliding portion adapted to be raised and lowered with respect to said fixed portion.

12. The removable truck bed insert of claim 11, wherein at least one of said first and second side assembly horizontal portions is connected to said vertical side wall by a hinge.

13. The removable truck bed insert of claim 11, wherein said side assemblies further comprise storage compartments mounted above at least one of said first or second side assembly horizontal portions.

14. The removable truck bed insert of claim 11 configured to accept front assemblies of different heights to accommodate larger or smaller loads.

15. The removable truck bed insert of claim 11, further comprising a sliding tonneau cover incorporated in and configured to unroll from said front assembly.

16. A removable truck bed insert for a truck having a cabin, a substantially rectangular truck bed, left and right side fenders having substantially flat top surfaces and roll bars extending vertically from the top surfaces of the respective left and right side fenders and adjacent to respective left and right sides of the truck bed, said removable truck bed insert comprising:

a bottom floor, left and right side assemblies coupled to said bottom floor along first and second edges and a substantially vertical front assembly coupled to said bottom floor along a third edge and configured to separate the cabin from the truck bed, wherein said side assemblies comprise substantially vertical side walls connected to first and second side assembly horizontal portions configured to rest on top of the respective left and right side fender top surfaces and wherein at least one of said first or second side assembly horizontal portions comprises an opening to accommodate passage of the roll bar, and a sliding tonneau cover incorporated in and configured to unroll from said front assembly.

17. The removable truck bed insert of claim 16, wherein at least one of said first and second side assembly horizontal portions is connected to said vertical side wall by a hinge.

18. The removable truck bed insert of claim 16, wherein said side assemblies further comprise storage compartments mounted above at least one of said first or second side assembly horizontal portions.

19. The removable truck bed insert of claim 16 configured to accept front assemblies of different heights to accommodate larger or smaller loads.

20. The removable truck bed insert of claim 16, wherein said tonneau cover unrolls from said front assembly along c-shaped channels attached to said left and right side assemblies.

\* \* \* \* \*